United States Patent [19]

Gayle et al.

[11] 4,064,889

[45] Dec. 27, 1977

[54] BREAK-AWAY SAFETY VALVE

[75] Inventors: Harold R. Gayle, Wilmington, Del.; Walter D. Wagner, Chadds Ford, Pa.

[73] Assignee: Sun Oil Company of Pennsylvania, Philadelphia, Pa.

[21] Appl. No.: 654,503

[22] Filed: Feb. 17, 1976

[51] Int. Cl.² .............................................. F16K 17/36
[52] U.S. Cl. .................................... 137/68 R; 137/539
[58] Field of Search ................. 137/68 R, 69, 71, 539, 137/533.11, 533.21

[56] References Cited

U.S. PATENT DOCUMENTS

| | | | |
|---|---|---|---|
| 675,990 | 6/1901 | Way | 137/539 X |
| 2,051,100 | 8/1936 | Nelson | 137/539 X |
| 2,765,801 | 10/1956 | Selim | 137/71 |
| 2,906,280 | 9/1959 | Mount | 137/68 R |
| 3,026,070 | 3/1962 | Sutton et al. | 137/68 R X |
| 3,794,057 | 2/1974 | Badger | 137/68 R |

Primary Examiner—Martin P. Schwadron
Assistant Examiner—Richard Gerard
Attorney, Agent, or Firm—J. Edward Hess; Donald R. Johnson; Paul Lipsitz

[57] ABSTRACT

A safety arrangement for a gasoline dispensing station equipped with a vapor recovery system. Gasoline vapors displaced from a motor vehicle fuel tank during filling are collected through the dispensing nozzle, and are directed first through a flexible hose attached to the nozzle and then through a pipe to an underground storage system. A preferred embodiment of a break-away valve is placed in the pipe near where it enters the ground such that in the event of an accident, as by an automobile running over the gasoline dispensing console, the break-away valve will automatically close to shut off the vapor recovery system. This minimizes the danger of an explosion or fire possibly caused by an open vapor recovery system.

2 Claims, 3 Drawing Figures

BREAK-AWAY SAFETY VALVE

BACKGROUND OF THE INVENTION

This application is related to application Ser. No. 626,418 for "Vapor Recovery System With Safety Valve," filed Oct. 28, 1975, which discloses much of the same information as this patent application.

Environmental Protection Agency regulations which have recently been promulgated require gasoline stations in some areas to be fitted with vapor recovery equipment. These regulations typically require the recovery of gasoline vapors previously vented to the atmosphere during two different operations. First, the regulations require the recovery of gasoline vapors displaced from an underground storage tank during filling of the tank by a drop from a tank truck. Secondly, the regulations require the recovery of gasoline vapors displaced during filling of the storage tank of a motor vehicle. A vapor recovery system designed to meet both requirements is disclosed in VAPOR RECOVERY SYSTEM FOR SERVICE STATIONS, patent application Ser. No. 538,057, filed Jan. 2, 1975 and now U.S. pat. No. 3,915,205. In that system, vapors displaced from a motor vehicle fuel tank during filling are directed through an underground manifold back to the underground storage tanks. The vapors are directed to the manifold by an underground pipe which enters the ground at the gasoline dispensing console.

Although many potential dangers of this system have been recognized, one dangerous aspect which thus far has been unrecognized is the inherent danger of an open vapor recovery system in an accident wherein the dispensing console is knocked over, as by an errant automobile, and the vapor recovery pipe is severed open. An open vapor recovery system, especially during the occurence of an accident, could present a dangerous opportunity for a fire or explosion.

SUMMARY OF THE INVENTION

In accordance with a preferred embodiment, a break-away valve is disclosed which is designed to automatically close in the event of substantial damage thereto. The break-away includes a valve housing having a break-away section which is separated from the remainder of the housing by a weakened portion. The valve further includes a valve seat and valve element adapted to close against the seat. A spring biases the valve element toward the valve seat to close the valve, but a severable pin retains the valve in an open position. The severable pin has a weakened section adapted to sever in the event the weakened portion of the valve housing severs, which allows the spring to force the valve closed.

DETAILED DESCRIPTION OF AN EMBODIMENT

Figure 1:
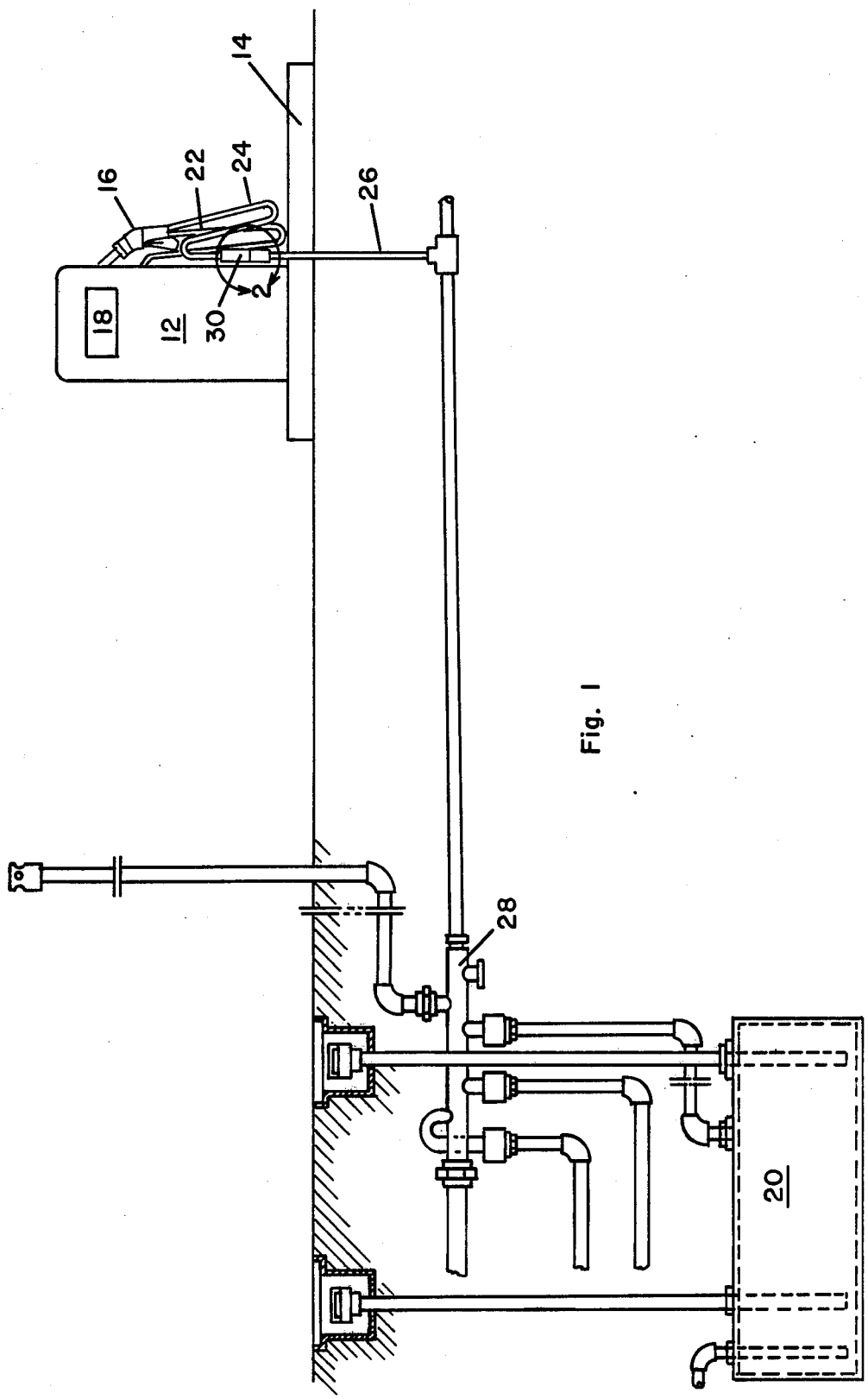
FIG. 1 illustrates an overall arrangement for a vapor recovery system constructed in accordance with the teachings of the present invention.

Referring to FIG. 1, there is illustrated on overall arrangement of a vapor recovery system constructed in accordance with the teachings of the present invention.

The overall operation of this system is disclosed in detail in patent application Ser. No. 583,057, filed Jan. 2, 1975 for VAPOR RECOVERY SYSTEM FOR SERVICE STATIONS. An island 10 of a typical service station has a dispensing console 12 positioned on a low pedestal 14. The console 12 supports a dispensing nozzle 16, and has typical registers 18 for displaying the quantity of gasoline pumped, the price per gallon (or liter), and the purchase price of the dispensed gasoline. The dispensing nozzle 16 is especially adapted for vapor recovery, and may be the type illustrated in patent application Ser. No. 609,760, filed Sept. 2, 1975. Gasoline being dispensed is pumped from an underground storgae tank, such as the one illustrated at 20, to the dispensing console and then through a flexible hose 22 to the dispensing nozzle 18. Gasoline vapors displaced from the motor vehicle tank are picked up by the nozzle and are directed through a flexible hose 24 to a pipe 26 to an underground manifold 28, and finally back to the underground storage tanks.

In accordance with the teachings of the present invention, a break-away valve 30 is positioned in the pipe 26 near where it enters the ground. The purpose of the valve is to automatically seal off the vapor recovery system in the event of an accident, as by an errant automobile running over the gasoline dispensing island, to minimize the danger of fire or explosion possibly caused by an open vapor recovery system.

Figure 3:
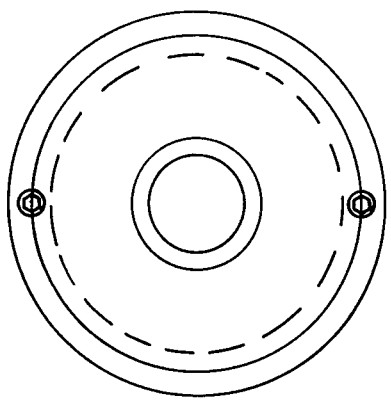
FIG. 3 is a top view of the valve shown in FIG. 2.
Figure 2:
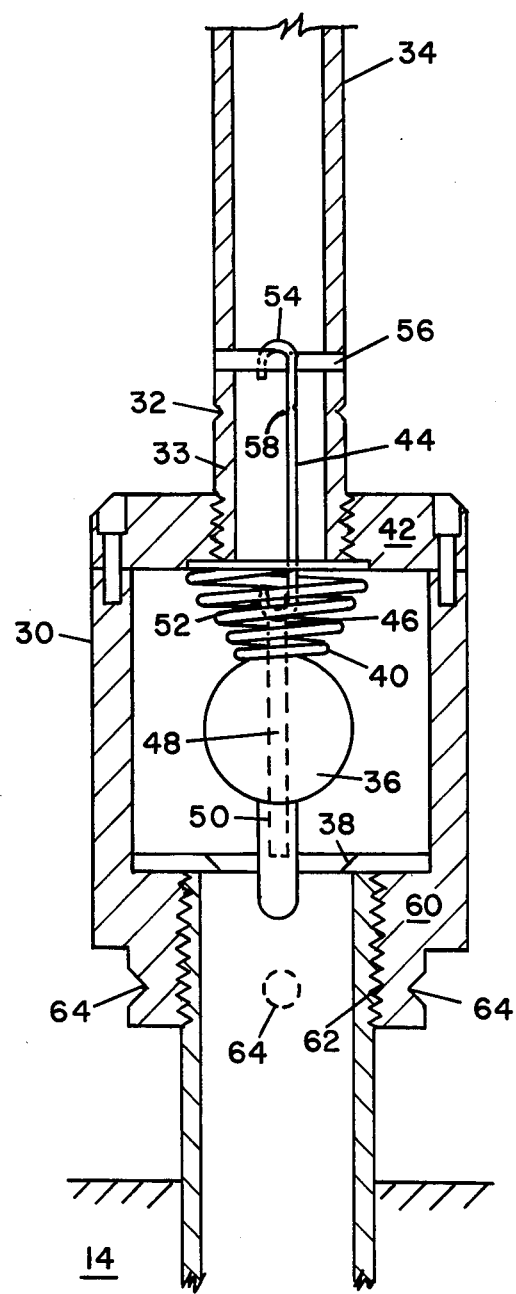
FIG. 2 is a partially cross-sectioned view of the break-away valve shown in FIG. 1.

FIG. 2 is a partially cross-sectioned view of the break-away valve shown in FIG. 1. The valve has a round cross sectional shape as shown clearly by FIG. 3. A weakened portion 32 extends fully around the circumference of a pipe 33, and separates a break-away section 34 from the remaining structure of the valve. The valve includes a ball 36 which is adapted to seat against a valve seat 38 when the valve is closed. When the valve is fully open, a coil spring 40 is compressed between an upper portion 42 of the valve housing and the ball 36. A break-away pin 44 extends between a hole 46 in an element 48 which runs through the ball and attaches to a lower guide element 50. The break-away pin includes a first U-shaped section 52 which extends through the hole 46 and a second U-shaped section 54. The second U-shaped section 54 is positioned around a retainer pin 56 which extends across the upper break-away section 34. In operation, if an automobile were to run over the valve 30, the break-away section 34 would sever from the remainder of the valve along the weakened portion 32, and the pin 44 would sever along its weakened portion 58, thereby allowing the compressed spring 40 to urge the ball 36 into sealing contact with the valve seat 38. This closes the valve, and seals off the vapor recovery system to minimize the danger of a fire or explosion from gasoline vapors in the recovery system. The guide pin 50 ensures that the spring 40 urges the ball 36 into aligned contact with the seat 38 when the pin 44 severs. The lower portion of the valve housing 60 includes a threaded portion 62 which is adapted to be coupled to the pipe 26 near the surface of the pedestal 14. In practice, the break-away valve may be positioned either at or slightly above or below the top surface of the pedestal 14. In the embodiment shown in FIG. 1 the valve is positioned slightly above the top surface of the pedestal. The lower portion 60 of the valve housing has a plurality of indentations 64 which are adapted to receive a spanner wrench during installation of the valve.

In one designed embodiment, the break-away section 34 was constructed of ⅛ inch diameter aluminum pipe, and the valve housing 42–60, valve seat 38, and break-away 44 were all made of aluminum. The smallest diameter of the valve seat was chosen to be ¾ inches, and the outside diameter of the valve housing was chosen to be 2¼ inches.

Different types of break-away valves have been known in the prior art. One such break-away valve is illustrated in U.S. Pat. No. 3,489,160. These prior art valves are typically placed in a gasoline supply line in a service station such that if the dispensing console is knocked over by an errant motor vehicle, liquid gasoline will not be spilled all over the service station. Spilled liquid gasoline during such an accident presents a danger problem which is recognized by the prior art. However, no one has recognized that a similar, but perhaps less dangerous, problem exists for vapor recovery systems.

Although the break-away valve has been illustrated in one environment, it might also be utilized in other situations wherein a break-away valve is desired.

The invention claimed is:

1. A break-away valve system designed to automatically close in the event of damage to the valve and comprising:
   a. a valve housing and a break-away section separated from said valve housing having a weakened portion which consists of a groove around the circumference of the break-away section whereby substantial force on the valve system results in separation of the break-away section from the housing
   b. said break-away section having a retainer means;
   c. a substantially circular valve seat within said valve housing;
   d. a valve element in said valve housing having a substantailly spherically shaped surface which is adapted to close against said valve seat to close the valve, and a guide element, extending through the valve element and loosely into the valve seat so that the guide element does not normally contact the valve seat when the valve is open, to guide the spherically shaped surface into a seating relationship against said valve seat while the valve is closing;
   e. spring means for biasing said valve element towards said valve seat to close the valve; and
   f. pin means coupled to said retainer means in said break-away section and extending through a general plane of the weakened groove and holding said valve element away from said valve seat against the bias of said spring means which places said pin means in tension, said pin means being adapted to sever in the event said valve system severs along the weakened portion, whereby the valve element is biased against the valve seat and closes the valve.

2. A break-away valve system as set forth in claim 1 wherein:
   a. said spring means includes a coiled spring coiled around said guide element with said coiled spring normally being in compression between said valve element and an inside section of said valve housing, whereby in the event of substantial force on the valve system causing severing along its weakened portion, the pin means will sever thereby allowing said coiled spring to drive the valve element against said valve seat under the guidance of said guide element to close the valve; and
   b. said retainer means is a retainer pin extending across the circumference of said break-away section.

* * * * *